United States Patent
Mallela et al.

(10) Patent No.: US 6,944,299 B1
(45) Date of Patent: Sep. 13, 2005

(54) METHOD FOR SYNCHRONOUS ENCRYPTION OVER A COMMUNICATION MEDIUM

(75) Inventors: Padma P. Mallela, Woodinville, WA (US); Robert Lee Maxwell, Duvall, WA (US); David J. Nix, Austin, TX (US); Gregory J. Veintimilla, Redmond, WA (US); Adrian M. Yip, Bothell, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 465 days.

(21) Appl. No.: 09/204,048

(22) Filed: Dec. 2, 1998

(51) Int. Cl.[7] .............................. H04L 9/00; H04N 7/167
(52) U.S. Cl. ....................... 380/262; 713/151; 713/178; 713/168; 380/239; 380/240
(58) Field of Search ................................ 713/151, 178; 380/239–283

(56) References Cited

U.S. PATENT DOCUMENTS

| | | | | |
|---|---|---|---|---|
| 3,349,175 A | * | 10/1967 | Meisingset | 380/262 |
| 4,613,901 A | * | 9/1986 | Gilhousen et al. | 358/122 |
| 5,070,528 A | * | 12/1991 | Hawe et al. | 713/161 |
| 5,235,644 A | * | 8/1993 | Gupta et al. | 713/161 |
| 5,371,794 A | * | 12/1994 | Diffie et al. | 713/156 |
| 5,420,866 A | * | 5/1995 | Wasilewski | 370/10 |
| 5,646,996 A | * | 7/1997 | Latka | 380/274 |
| 5,870,474 A | * | 2/1999 | Wasilewski et al. | 380/21 |
| 6,028,933 A | * | 2/2000 | Heer et al. | 713/169 |
| 6,070,245 A | * | 5/2000 | Murphy, Jr. et al. | 713/201 |
| 6,148,082 A | * | 11/2000 | Slattery et al. | 380/212 |
| 6,188,766 B1 | * | 2/2001 | Kocher | 380/246 |
| 6,222,924 B1 | * | 4/2001 | Salomaki | 380/200 |
| 6,223,286 B1 | * | 4/2001 | Hashimoto | 713/178 |
| 6,469,991 B1 | * | 10/2002 | Chuah | 370/329 |

OTHER PUBLICATIONS

Denning, cryptography and data security; Jan. 1983; addison–Wesley publishing Company, Inc. 135–147.*
BSchneier, B; applied Cryptography, 2nd edition, John Wiley & sons, 1996 pp. 205–206 . . . ☐ ☐.*
Eric A. Blossom; The VPI Protocol for Voice Privacy Devices; Version 1.2; Communication Security Corporation; Aug. 7, 1999.*

* cited by examiner

*Primary Examiner*—Gilberto Barron, Jr.
*Assistant Examiner*—Kambiz Zand
(74) *Attorney, Agent, or Firm*—Kenyon and Kenyon

(57) ABSTRACT

An apparatus and method provide for synchronized operation of encryption processes at two remote communication terminals. A first one of the terminals detects information associated with a current time during the establishment of a connection between the two terminals. The current time information is then utilized to create a start encryption time. That start encryption time information is transmitted from the first terminal to the second terminal. Both terminals then monitor the passage of time and begin encryption in a synchronous manner when the current time matches the start encryption time.

11 Claims, 3 Drawing Sheets

METHOD FOR SYNCHRONOUS ENCRYPTION OVER A COMMUNICATION MEDIUM

FIELD OF THE INVENTION

The present invention is directed to a method and apparatus for providing synchronous encryption over a communication medium. More particularly, the present invention is directed to a method and apparatus by which two communicating devices establish a time period for initiating encryption.

BACKGROUND

As people replace face-to-face meetings with longer distance communications, the need for providing security in those technology-based communications has become more pronounced. It has long been accepted that telephone communications via plain old telephone service (POTS) is a relatively secure communication service in view of the fact that it is considered illegal to intercept or tap into communications over these wireline networks. The network providers themselves provide a high degree of security for the communication. By contrast, alternative techniques for communication are more susceptible to security leaks. For instance, wireless communications, such as mobile telephony or a service referred to as "fixed wireless", rely on air links between communicating terminals. These airlinks by their very nature are not secure. While aggressively copying information from the air waves may be considered inappropriate and illegal, the mere detection of that information is not. Privacy or expectations of security are not regularly attributed to such wireless communications. Furthermore, certain data communications, such as those which are routed on the Internet via various router devices, may also be considered to be susceptible to privacy leaks.

Where the communication medium is susceptible to security breaches, it is beneficial to provide some technique for improving the security of the messages transmitted over the medium. In particular, one such technique involves encrypting messages before they are transmitted and decrypting them at the receiving communication terminal. Various encryption techniques are known and available. Where the data is stream-like in nature, it may be possible to use block-type encryption such as the Data Encryption Standard (DES) (Federal Information Publishing Standards, FIPS Pub. 46). This typically requires the use of an Application Specific Integrated Circuit (ASIC) because it can be computationally intensive. Alternatively, where there is a high degree of synchronization between a pair of communication terminals, it might be possible to use a more robust stream type encryption method such as that referred to as RC4 encryption. RC4 was developed by RSA Data Security Incorporated. This encryption technique is very robust and is not computationally intensive.

Some encryption techniques require that the encryption engines in the communicating terminals be synchronized since the encryption/decryption key is designed to vary over the passage of time. The RC4 encryption process is one such encryption technique. Not all of the communication media for which encryption is desirable are easily adaptable to the synchronization needs of the synchronous encryption methods such as RC4. It would be beneficial if there was a way, in for instance a packet data transfer environment, that such synchronization could be provided to enable deployment of a lightweight encryption/decryption method such as RC4.

SUMMARY OF THE INVENTION

The present invention provides a technique by which synchronization between two communication terminals can be more easily established so as to enable deployment of a lightweight encryption algorithm that relies on synchronized encryption engines, such as RC4. In accordance with one embodiment of the present invention once a physical layer connection between the two communication terminals is established, one of the terminals, such as a base station in a wireless communication network, determines the current time for the connection. This could be represented by the packet count for the connection. That first communication terminal then establishes an encryption start time or start packet number and transmits that information to the second communication terminal. Both terminals then monitor the passage of time, such as by monitoring the packet count, and begin their encryption processing based on detection of a time or packet count that matches the start encryption time or packet count designated by the first communication terminal.

The present invention further provides that the first communication terminal can periodically test to determine whether the ongoing connection between the two terminals remains appropriately synchronized. This overcomes errors that might arise over time between the two operation systems of the communication terminals. To accomplish this, the present invention provides for periodically examining data in a payload before that data is encrypted. Characteristics of that data are determined. For example, a checksum with regard to that data could be calculated. The detected characteristic and the encrypted data payload can be combined together and transmitted to the second communication terminal. At that terminal the characteristic information is stripped from the payload. The payload is then decrypted and the second communication terminal performs the same detection operation as was performed at the first communication terminal. The two sets of detected characteristics, for example two check sums, are compared to one another. If they match, then the system infers that the encryption engines remain synchronous. If, on the other hand, the detected characteristics differ, then the system infers that the terminals have lost synchronization with regard to their encryption engines. The system then re-establishes synchronization between the encryption engines using the technique described for initiating synchronized encryption operations.

DETAILED DESCRIPTION

The present invention is directed to a method and apparatus for synchronizing encryption engines in two communication terminals so that secure and accurate data communications can be effected between the terminals. A system in which the present invention can be employed is shown in block diagram form in FIG. 1. This figures shows a base station 101 which can be connected to a switch 102. The switch could be a voice or data switch. The base station can communicate with a plurality of remote units, 103 and 104.

Figure 1:
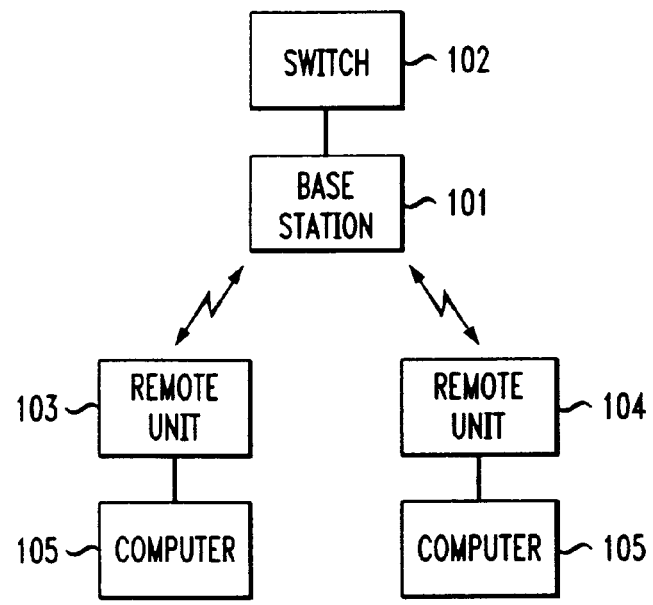
FIG. 1 provides a block diagram illustration of a system in which the present invention can be employed.
Figure 2:
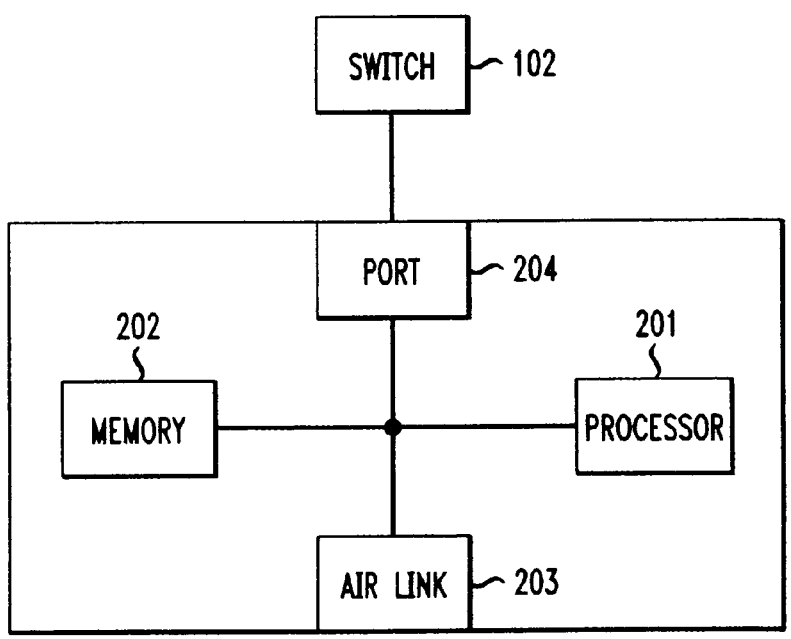
FIGS. 2 and 3 provide block diagram illustrations of elements of FIG. 1.

An example of a base station is illustrated in FIG. 2, also in block diagram form. In this configuration the base station can include a processor or controller 201, a memory 202 and an air link interface 203. The memory can store various programs for effecting control of the base station by interacting with the processor 201. The air link interface provides a transmitter/receiver combination. The transmitter generates signals for transmission via air wave to any of a plurality of remote units such as those shown as elements 103 and 104 of FIG. 1. The receiver is adapted to receive signals via an air link from the remote units. A port 204 is coupled to the switch 102 for providing voice and/or data information into a telecommunications network. The switch can also be coupled to the base station to transmit and receive control signals.

Figure 3:
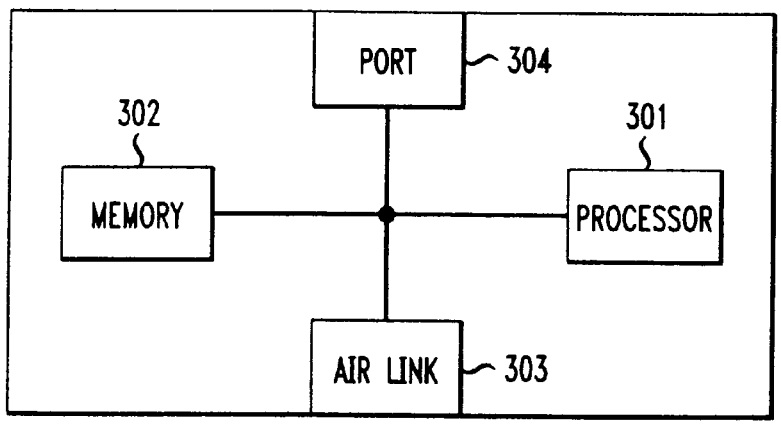

Examples of remote units are shown in block diagram form in FIG. 3. Like their counterpart base stations, the remote units might contain a processor 301, a memory 302 and an air link 303. A port 304 could provide an interface to a device such as a computer, e.g. a PC, to a telephone or other communication device.

In the system of FIG. 1 the remote units can be either mobile units or could be components of a system known as a fixed wireless system. In either case, the base station and the remote units are capable of establishing air links for carrying information between these communication terminals. In one configuration, the messages from the base station to the remote units would traverse a channel referred to as the forward channel while messages transmitted from the remote unit to the base station would traverse an air link channel referred to as the reverse channel. The particulars of channel assignment do not have a bearing on the implementation of the present invention. Various techniques are known for using control signaling to establish the communication channel(s) to enable the base station to communicate with a plurality of remote units. The present invention could be deployed with equal success in systems employing any one of these techniques.

In accordance with the present invention, it is possible to implement an encryption technique over the air link channels so as to provide more secure transmissions between a given remote unit and the base station. In one environment, this could be done to encrypt voice communications. Alternatively, it could be done to encrypt data communications.

An overview of how to achieve synchronism between the communication terminals in the system of the present invention so as to enable certain encryption techniques will first be described and then details of such a synchronization arrangement will be provided.

In the technique of the present invention, it is presumed that one of the communication terminals will be the control terminal for establishing synchronism. For the system illustrated in FIG. 1, it will be presumed that the base station is the system element that establishes the parameters for synchronizing the encryption method. In other communication systems either one of the communication terminals may be used as the terminal to establish synchronism. Also, it should be noted at this time that while the present invention is described in relationship to a system that employs air links for communicating between a base station and remote units, it is possible that the present invention could be employed in other configurations where encryption synchronization is of significance. Having selected the base station as the communication terminal responsible for establishing synchronism, the general operations performed by the base station and the remote unit are as follows.

The base station and the remote unit first must establish some sort of physical connection via the air link so as to provide a channel for communicating not only data messages but control messages. Once this physical layer connection is established, the base station then determines whether encryption techniques will be employed in connection with the communications to be carried out with the remote unit in question. It is possible that the system will select encryption as a default operation. Alternatively, encrypted communications may be an option that could be selected by the end user at the remote unit. If encryption is to be carried out, then the base station understands that it must implement a synchronization process so that encryption engines in the base station and the remote unit operate in synchronism. The encryption engine is presumed to include encryption algorithms and decryption algorithms. These algorithms could be stored in memories of the base station and the remote units and excited by the respective processors. An example of an encryption technique which might be employed in connection with the present invention is the RC4 encryption algorithm. In such a circumstance, the encryption engines of the base station and the selected remote unit would both implement the RC4 encryption and decryption techniques. Transmissions from the base station would therefore be encrypted, transmitted along the forward channel and decrypted at the remote unit. Furthermore, transmissions from the remote unit to the base station would be encrypted at the remote unit, transmitted over the reverse channel and decrypted at the base station using these encryption engines.

For a pair of encryption engines, one encrypting at a first end of the channel and at the other decrypting at the other end of the channel, it is necessary for the pair to be in synchronism so as to continue to each generate the same varying key. As the key varies, it is important that the key used by the base station to encrypt data is the same as that utilized by the remote unit to decrypt the data. To assure this synchronism, the base station and remote unit establish a starting time for the encryption engines in the base station and remote unit whereby the starting times will effect synchronous operations for the encryption engines. In particular, the base station can detect a current time in the connection arrangement between the base station and the remote unit and then, using the current time, establish a time in the future at which the remote unit and the base station should initiate their encryption processing operations. This time is set far enough into the future from the current time so that the base station can transmit an identification of this future time to the remote unit and the remote unit will be able to detect and understand this information prior to the time that the time of the system matches the time set by the base station, that is, the time for starting the encryption processing is set far enough into the future to account for propagation delays from the base station to the remote unit as well as the amount of time necessary for the remote unit to process a received control signal package.

In a packet data network configuration which might be employed with the base station/remote unit combination illustrated in FIG. 1, the current time detected by the base station could correspond to a packet count related to the connection between the base station and the remote unit. This packet count can be kept on a global basis for the connection. The packet count serves as a reference point for the communication. In such a system, for instance, the packet count is equivalent to a timer or clock set in the base station. However, instead of being based simply on a passage of time, a packet count is taken as a number of time intervals represented by that time which would elapse for a given packet, for instance a packet might be represented by a 375 microsecond time interval. As time passes, then the packet count increases by one with the passage of every 375 microsecond time interval. Once the base station has information about the current packet count, then it in effect has information regarding the current time for the connection between the base station and the remote unit.

Having detected the packet count, the base station can then set an encryption start time by selecting some packet count number into the future which will be the packet count number to trigger the start of encryption. The base station sets the packet number for start of encryption taking into account the propagation and processing delays described above. The base station can then use this calculated or created start point to begin the encryption processing at the base station. Furthermore, the base station can calculate a start time for the remote unit and transmit that packet count information identifying the starting time to the remote unit over the air link in a control package. While as a general proposition the description of the present invention refers to the base station setting a start time and that start time is used by both the base station and the remote unit, it should be understood that the present invention is also intended to cover those situations where, based on propagation and processing delays, it is appropriate to start the encryption algorithm at the remote unit at some delay after the process has started at the base station. This would account for the fact that, as a packet is encrypted at the base station, it is not immediately received at the remote unit. Thus, if the remote unit was operating at the exact same starting point in such a scenario, the decryption key used by the remote unit to decrypt a first packet of information from the base station might not correspond to the encryption key used at the base station for the first packet. For example, assuming that the key changes with the passage of each packet time interval, if the time period for transmitting the data from the base station to the remote unit takes three packet time intervals and the encryption algorithms at both the remote unit and the base station start at exactly the same time, then a first encryption key for the first data packet would be used to encrypt the data at the base station; but since the data packet would be received at a third time interval, the remote unit would use the decrypt key for the third data packet and thereby fail to accurately decrypt the information transmitted from the base station. To accommodate for this timing offset for the transmission and processing of messages between the base station and the remote unit, the present invention can take into account the fact that the encryption engines at the base station and remote unit will not start at exactly the same moment. Nonetheless, the base station, knowing information about the transmission and processing delays for the system since such delays are typically based on hardware selected for system implementation, the base station can advise the remote unit of a different packet count starting time than it selects for encrypting the data in the base station itself. While it is important to recognize this potential difference as a practical matter in implementing the present invention, for theoretical purposes and understanding the concepts of the present invention it is sufficient to assume that the transmission/processing delay is zero so that the encryption algorithms in the base station and the remote units start at the same packet count number.

Figure 4:
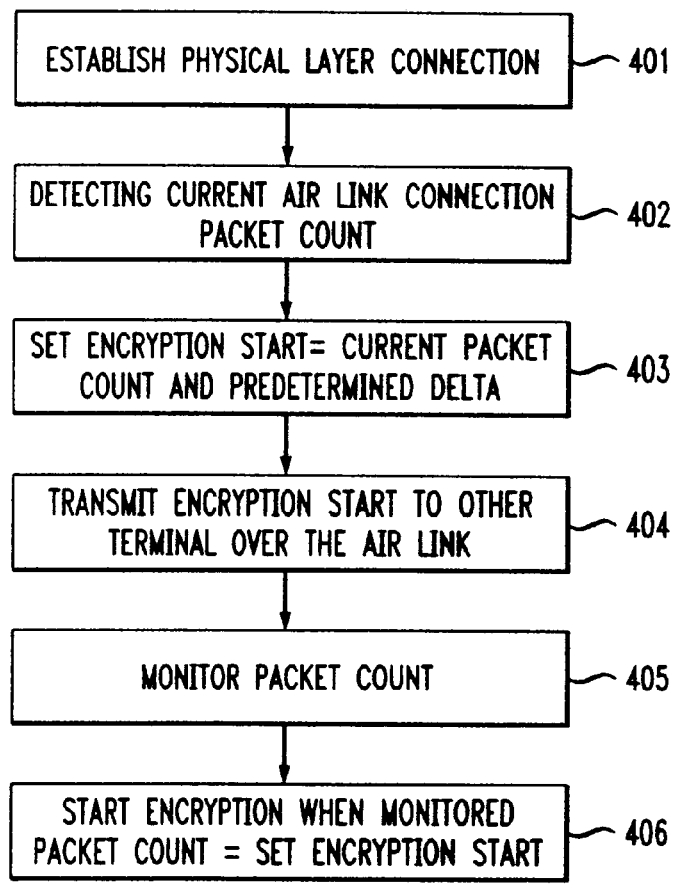
FIG. 4 illustrates a flow chart describing a method in accordance with an embodiment of the present invention.

By setting a time into the future for starting the encryption algorithms in the two communication terminals, the present invention allows the communication terminals to synchronize the start of their encryption processes, thereby facilitating the use of a more lightweight encryption architecture such as the RC4 encryption method. The method for establishing this synchronization will now be explained in more detail with regard to the flow chart of FIG. 4.

First, the communication terminals must establish a physical layer connection, step 401. One of the communication terminals, such as the base station, can then detect a current air link connection packet count, step 402. The detecting communication terminal then sets an encryption start time or count equal to the current packet count plus some predetermined delta where the delta represents a number of packet intervals large enough to compensate for the fact that this information about start time must be transmitted to the other communication terminal. The first communication terminal then transmits the encryption start information to the other terminal over the air link, step 404. Both communication terminals then monitor the packet count, step 405. Each communication terminal could then start encryption when the monitored packet count is equal to the encryption start packet count set by the first communication terminal, step 406. As indicated above, this starting of the encryption processes at the base station and remote unit may take into account the fact that the processes do not start simultaneously at both communication terminals.

Having described a technique for establishing synchronous communications between the two remote communication terminals, it should be noted that the present invention is also designed to provide synchronism in those communication media arrangements which do not explicitly involve packet counts. Instead, other arrangements might be employed whereby one or both of the communication terminals that are coupled to one another have access to system time information. Then one of the communication terminals, detecting such system time information, can set a time in the future at which the encryption engines of the respective terminals can be initiated. Thus, alternatives to packet counts, such as using timers or other indicators of system time, might be employable.

Having described a technique for establishing synchronization between two communicating terminals, it is beneficial to note that circumstances may arise where, having established such synchronized communications, the synchronization could be lost. This can arise where the software operating in the processor or processors of the base station and remote units suffer from software upsets or packet loss. If synchronization is lost, then the encryption engines of the two communicating terminals will be using different keys on the same packet of information, thereby frustrating the receiver of information from being able to decipher the secure transmission. To overcome this problem, the present invention employs a technique for periodically checking the status of synchronization in the communication. In one embodiment of the present invention, one of the communication terminals, for instance the base station, assumes responsibility for this synchronization updating operation. It is expected, however, that either communication terminal could accept responsibility for this operation. Nonetheless, in the example shown, it is assumed that the base station assumes responsibility for updating synchronization in the system. In this case the base station then can, on a periodic basis, examine one of the payloads to be encrypted at the base station and transmitted to the remote unit. The examination takes place prior to encryption and involves detection of some characteristic which is unique or relatively unique regarding the payload. One example of a relatively unique characteristic would be the checksum for the payload. Where, for example, frames of information constituting 132 bits with a 120 bit encrypted traffic stream with a twelve bit non-encrypted portion including a four bit header and an eight bit payload, it is possible to detect a characteristic of the encrypted 120 bit traffic, such as a checksum for the traffic, and insert that characteristic in the eight bit non-encrypted payload. The base station then performs the expected encryption on the 120 bit data payload. The encrypted data and the eight bit checksum are forwarded together via the air link to the remote terminal. Upon receipt at the remote terminal, the checksum or data indicator portion is stripped from the 132 bit message. Furthermore, the 120 bit data payload that is encrypted is decrypted by the remote unit decryption algorithm using the key available to the remote unit at that time. The decrypted payload is then subjected to a detection operation similar to that performed on the data payload at the remote unit, for example a checksum of the unencrypted data might be calculated at the remote unit. The data characteristic information obtained by the detection operation at the remote unit is then compared to the data characteristic information transmitted from the base station to the remote unit. Again, using the checksum information as an example, the base station could transmit a checksum of the 120 bit payload and the remote unit could calculate its own checksum on the decrypted payload. The remote unit then compares the checksums or data characteristics. If the data characteristics match, then it is presumed that the remote unit has used the appropriate key for decrypting the encrypted payload transmitted by the base station. It is presumed then that the two communication terminals continue to act in a synchronous manner. If, however, the data characteristics or in this example the checksums do not match, then it is presumed that the two communication terminals have fallen out of synchronism with one another. To remedy this situation, the present invention employs the technique of establishing synchronization that was described above, in connection with initializing the connection between the two communication terminals, to perform a synchronization establishment process.

Figure 5:
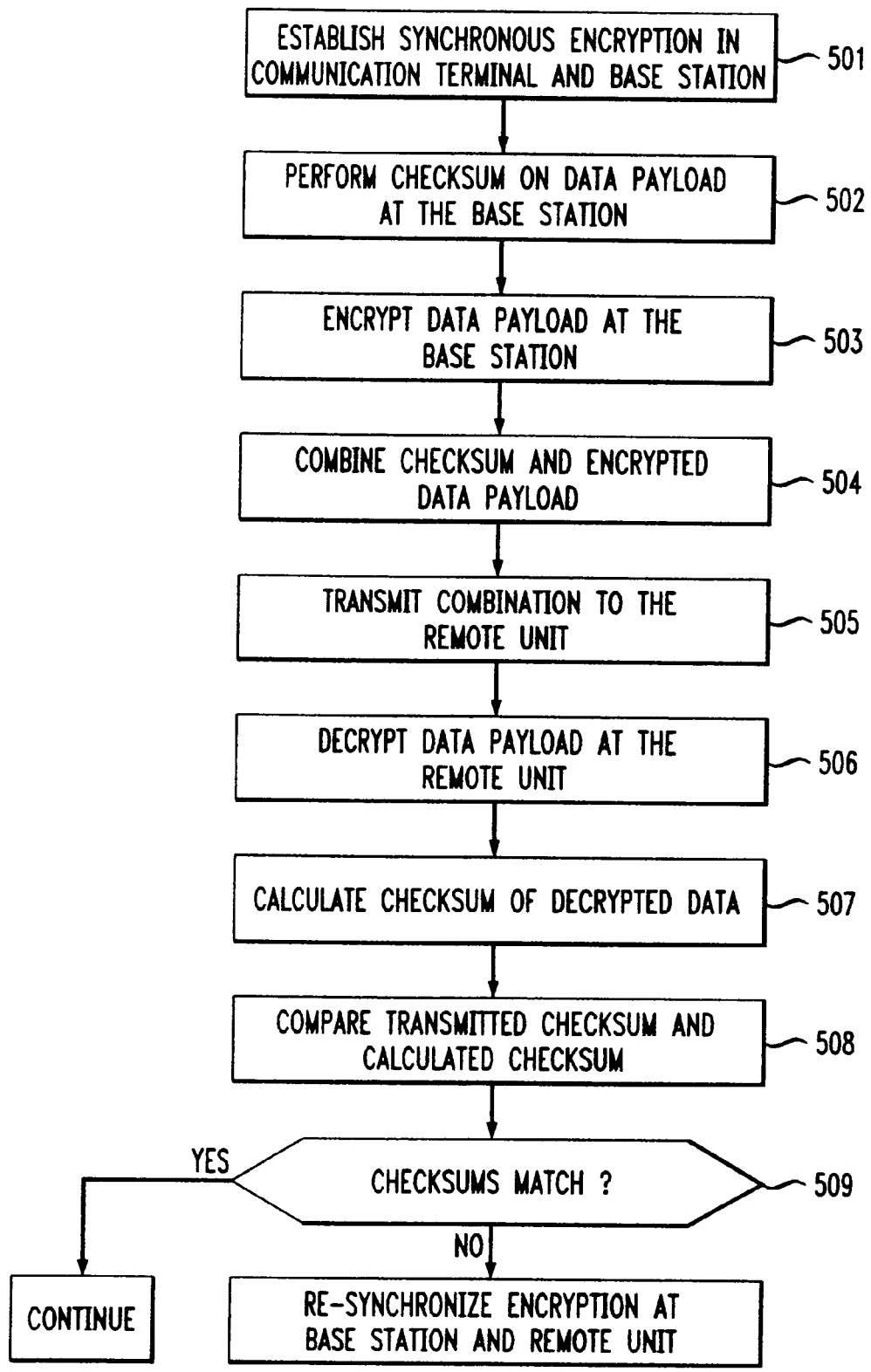
FIG. 5 illustrates a flow chart that describes a method in accordance with another embodiment of the present invention.

FIG. 5 of the present application illustrates a flow chart useful for describing a potential embodiment of the present invention by which synchronization can be re-established.

First, it is presumed that the communication terminals have established synchronous encryption, step 501. This could be established using a technique such as that described above with reference to FIG. 4. Then, one of the communication terminals, for instance the base station, performs a checksum on the data payload, step 502. The base station then encrypts the data payload, step 503, and combines the checksum and the encrypted data payload into a packet for transmission to a second communication terminal, such as a remote unit. The base station then transmits the combination to the remote unit, step 505. The remote unit decrypts the data payload, step 506, and calculates a checksum of the decrypted data, step 507. The remote unit then compares the transmitted checksum and the calculated checksum, step 508. It is determined whether the checksums match, step 509; and if they do, the system continues the communication which it has previously undertaken and awaits another synchronization check. In that regard, the system could be arranged to periodically check for synchronization and some mechanism for signaling the base station to periodically implement this synchronization check could be appropriate. One such device might be a clock or timer. If the checksums do not match, then the system can re-synchronize the encryption processing at the base station and at the remote unit. In particular, the above described technique for initiating synchronization can be employed to restart synchronization.

The present invention provides a technique for initiating synchronization between two communicating terminals so as to enable encryption processing which is supported by such synchronous operations. Furthermore, the present invention provides techniques for maintaining synchronization after it has been established. As a consequence, communications between terminals can be more effectively made secure even using a lightweight encryption technique with reduced complexity. This technique can be employed across various communication media which permit tracking of system time and control signaling between the communication terminals so that one communication terminal can advise the other of a time in the future for starting encryption processing.

What is claimed is:

1. A method for providing synchronized encryption in a packet data communication between a first communication terminal and a second communication terminal along a communication medium, the method comprising:

establishing a first layer connection between the first and second communication terminals on the communication medium; and at the first communication terminal, detecting a current packet count for the first layer connection, adding a pre-determined number to the detected current packet count to create an encryption-start packet count, and transmitting the created encryption-start packet count to the second communication terminal via the communication medium.

2. The method of claim 1 further including:

monitoring, at the first communication terminal the packet count, and when said monitored packet count matches the encryption-start packet count, initiating encryption of packet data to be transmitted to said second communication terminal.

3. The method of claim 2 wherein said predetermined number accounts for a transmission delay from the first communication terminal to the second communication terminal.

4. In a wireless communication system comprising a base station and a plurality of remote units, a method for controlling encrypted packet data transmissions between the base station and a first remote unit from the plurality of remote units, the method comprising:

establishing an airlink connection between the base station and the first remote unit;

detecting current packet count information for the airlink connection;

creating an encryption start packet count using the detected current packet count information;

transmitting the created encryption start packet count to the first remote unit;

monitoring packet count for the airlink link connection; and initiating encryption processing at the base station when the monitored packet count corresponds to the created encryption start packet count.

5. The method of claim 4 wherein said step of creating includes adding a pre-determined number to the detected current packet count information, said predetermined number selected with reference to a packet transmission delay.

6. In a communication system including a first communication terminal, a second communication terminal and a communication medium for carrying messages between said terminals, a method for maintaining synchronous encryption processing at the first and second communication terminals, the method comprising:

computing a checksum for a data payload to be encrypted at the first communication terminals;

encrypting said data payload;

transmitting the computed checksum and the encrypted data payload to the second communication terminal;

decrypting the encrypted data payload at the second communication terminal;

computing a checksum for the decrypted data payload;

comparing the checksum transmitted from the first communication terminal to the checksum computed for the decrypted data payload; and if the compared checksums do not match, re-starting the encryption processing in the first and second communication terminals to be synchronous by:

receiving notice at the first communication terminal that the encryption processing at the first and second communication terminals are not synchronized;

detecting current packet count information at the first communication terminal;

creating an encryption start packet count from the detected current packet count information;

transmitting the encryption-start packet count to the second communication terminal; and re-starting encryption processing at the first and second communication terminals using the encryption-start packet count.

7. In a communication system including a first communication terminal, a second communication terminal and a communication medium for carrying messages between said terminals, a method for maintaining synchronous encryption processing at the first and second communication terminals, the method comprising:

detecting a characteristic of a data payload to be encrypted at the first communication terminal;

encrypting said data payload;

transmitting the encrypted data payload and the detected characteristic to the second communication terminal;

decrypting the encrypted data payload at the second communication terminal;

detecting a characteristic of the decrypted data payload;

comparing the transmitted detected characteristic to the detected characteristic of the decrypted data payload; and if the compared detected characteristics do not match, re-starting encryption processing in the first and second communication terminals to be synchronous.

8. The method of claim 7 wherein said step of re-starting the encryption process comprises:

receiving notice at the first communication terminal that the encryption processing at the first and second communication terminals are not synchronized;

detecting current packet count information at the first communication terminal;

creating an encryption start packet count from the detected current packet count information;

transmitting the encryption-start packet count to the second communication terminal; and re-starting encryption processing at the first and second communication terminals using the encryption-start packet count.

9. A method for providing synchronized encryption in a packet data communication between a first communication terminal and a second communication terminal along a communication medium, the method comprising:

establishing a first layer connection between the first and second communication terminals on the communication medium;

at the first communication terminal, a) detecting a current packet count for the first layer connection, b) adding a pre-determined number to the detected current packet count to create an encryption-start packet count, and c) transmitting the created encryption-start packet count to the second communication terminal via the communication medium;

periodically checking whether the encryption processing in the first and second communication terminals are synchronous; and if it is determined that the encryption processing in the first and second communication terminals repeating substeps a), b), and c) to re-establish synchronous encryption processing at the first and second communication terminals.

10. The method of claim 9 further including:

monitoring, at the first communication terminal the packet count, and when said monitored packet count matches the encryption-start packet count, initiating encryption of packet data to be transmitted to said second communication terminal.

11. The method of claim 10 wherein said predetermined number accounts for a transmission delay from the first communication terminal to the second communication terminal.

* * * * *